United States Patent [19]
Thorud et al.

[11] 3,910,017
[45] Oct. 7, 1975

[54] ROTARY MOWER BLADE

[75] Inventors: Richard A. Thorud, Bloomington; Herman P. Christopherson, Burnsville, both of Minn.

[73] Assignee: The Toro Company, Bloomington, Minn.

[22] Filed: July 26, 1974

[21] Appl. No.: 492,337

[52] U.S. Cl. .................................. 56/295; 56/295
[51] Int. Cl.[2] ....................................... A01D 55/18
[58] Field of Search ................................ 56/295

[56] References Cited
UNITED STATES PATENTS

| | | | |
|---|---|---|---|
| 2,854,807 | 10/1958 | Byler et al. ........................... | 56/295 |
| 3,085,386 | 4/1963 | Slemmons.............................. | 56/295 X |
| 3,220,170 | 11/1965 | Smith et al.......................... | 56/295 X |
| 3,534,534 | 10/1970 | Raiti ..................................... | 56/295 |

*Primary Examiner*—J. N. Eskovitz
*Attorney, Agent, or Firm*—Merchant, Gould, Smith & Edell

[57] ABSTRACT

An improved blade for rotary lawn mowers, having outward tips with longitudinally extending cutting edges and a central portion with lateral flanges, and having medial reinforcing ribs extending longitudinally outward from locations inward of the termination of the flanges. Two embodiments are shown, one in which the blade is flat and the ribs do not extend outward as far as the beginnings of the cutting edges, and one which defines a pair of central dihedral angles and is outwardly discontinuous angularly in its connection to the cutting tips, and in which the ribs extend across the dihedral angles and the discontinuities beyond the inward beginnings of the cutting edges. The blades are of uniform thickness, and the ribs are narrower outwardly than inwardly, terminate outwardly in right circular conical surfaces and inwardly in oblique circular conical surfaces, and are of uniform height between the terminations.

2 Claims, 5 Drawing Figures

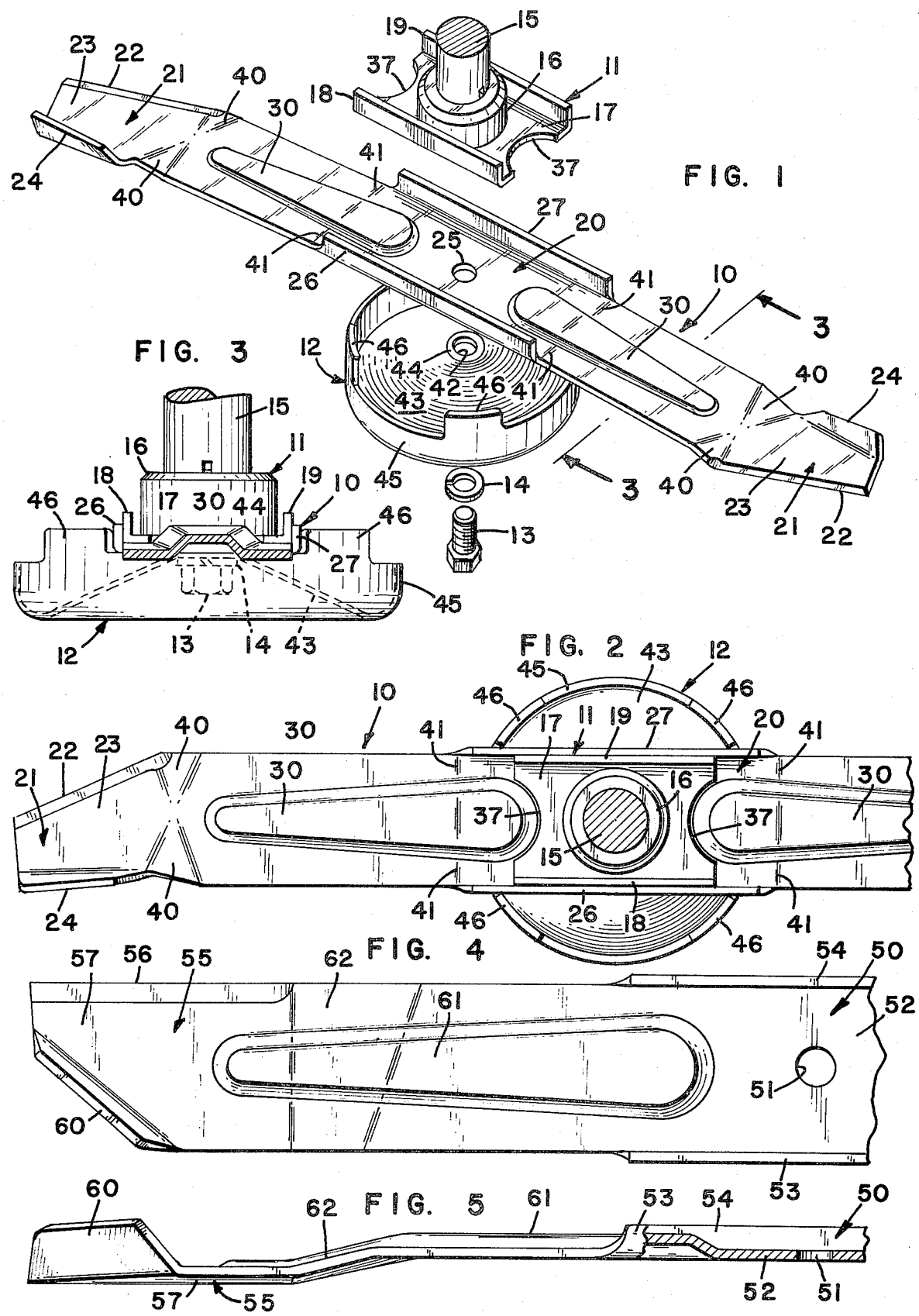
U.S. Patent Oct. 7, 1975 3,910,017

ROTARY MOWER BLADE

BACKGROUND OF THE INVENTION

This invention relates to rotary lawn mowers, and more particularly to improved blades for use in such mowers.

Although simple in appearance, blades for this use are much more sophisticated than a mere flat bar spinning in its own plane and breaking grass off by impact. The blade and the housing in which it spins constitute a quite complex aerodynamical system, especially when the grass is not only to be mowed but delivered to a collecting bag. The velocity of the air within the housing must always be sufficiently large and properly directed to carry mown grass through a discharge opening, and to accomplish this with a minimum wastage of the power available from economically feasible engines calls for a high degree of skill.

One of the indispensable characteristics of a mower blade is rigidity. Its ends must not flap like a bird's wings, as even slight oscillations in this mode are wasteful of power. Moreover, a blade is always subject to a certain amount of inadvertent impingement, and must be strong enough to withstand the resulting stresses. The addition of strength by increased blade thickness, however, is expensive and wasteful of power, and the alternate expedient of using thinner metal and providing a longitudinal reinforcing rib has been utilized, the rib being formed to extend downwardly so as not to interfere with the mounting of the blade.

SUMMARY OF THE INVENTION

We have discovered that while the downward ribs serve their mechanical purpose, they introduce an unforeseen disturbance for the air flow in the housing, particularly when the mower is to be used in a bagging mode. We have also discovered that if the ribs are formed in the blade extending upwardly rather than downwardly the aero dynamic difficulties are in a large measure overcome: the movement of air carrying the mown grass from the point of cutting to the collecting bag is less disturbed and better directed, and the engine power lost in windage is reduced.

It is accordingly one object of the invention to provide new and improved rotary mower blades. Another object of the invention is to provide means for strengthening a mower blade without at the same time increasing the power required to drive it and without disturbing the desired flow of air through the mower. A more specific object is to provide a mower blade having medial longitudinal reinforcing ribs projecting upwardly from its upper surface and located at positions outwardly from the center of the blade.

Various other objects, advantages, and features of novelty which characterize our invention are pointed out with particularity in the claims annexed hereto and forming a part hereof. However, for a better understanding of the invention, its advantages, and objects attained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing FIG. 1 is a exploded perspective view of one embodiment of our invention, giving also details of its drive connection to a mower engine;

FIG. 2 is a plan view of the assembled embodiment of FIG. 1;

FIG. 3 is a section taken along the line 3—3 of FIG. 1;

and FIGS. 4 and 5 are fragmentary plan and elevational views of a modified blade embodying the invention.

DESCRIPTION OF THE PREFERRED EMBODIMENT

FIGS. 1–3 show a blade 10 embodying the invention in relation to a blade retainer 11, and an anti-scalping cap 12, to be held in assembled relation by a suitable bolt 13 and lock washer 14. Retainer 11 may be keyed or otherwise suitably secured to the vertical crank shaft 15 of the mower engine, and includes a collar 16 unitary with a rectangular drive member 17 having a broad shallow channel configuration including low walls 18 and 19. Shaft 15 is tapped to receive bolt 13.

Blade 10 has a central portion 20 and a pair of cutting tips 21 each having a bevel cutting edge 22, which is of course a leading edge when the blade is in rotation, a body 23, and a trailing sail 24 configured to cooperate with the housing to cause the appropriate air flow. The blade is bored at its center as at 25 to pass bolt 13, and has a pair of upturned flanges 26 and 27 along the central portion of its edges to closely engage walls 18, 19 of member 11. Because of the high windage losses which would result, flanges 26 and 27 do not extend the full length of the blade, so that their secondary reinforcing effect is lost. Medial reinforcing ribs 30 are provided and extend longitudinally outward along the blade from locations which are nearer the center of the blade than the ends of flanges 26, 27. The blade is of substantially uniform thickness, and ribs 30 are struck upwardly to project at a uniform height above the blade. The sides of the ribs are smooth faired slopes, and the ends of the ribs are faired conical surfaces, the outer end being a right circular conical surface and the inner end being an oblique circular conical surface. Each rib is wider near the center of the blade, and narrows toward its tip. Retainer 11 may be provided with cutouts 37 at its ends to give clearance for ribs 30 if this is desired.

Tips 21 are angularly discontinuous with central portion 20, as indicated at 40, and in the embodiment of the invention shown in FIGS. 1–3, ribs 30 do not extend across the discontinuities. The blade is, however, formed with slight downward bends 41 near the ends of flanges 26 and 27, and ribs 30 do extend across bends 41. The combined effect of bends 41 and discontinuities 40 is to cause the cutting edges 22 to extend below the center of the blade, so that the latter does not ordinarily contact the area being mowed. Occasionally, however, a surface to be mowed has a sharp hillock, for example, and to prevent the mower from "scalping" such area anti-scalping cup 12 is provided having a central bore 42 and an upwardly concave bottom 43 formed at 44 to engage the undersurface of blade 10 near its center, and having walls 45 with upward lips 46 dimensioned to engage blade 10 at flanges 26, 27, the whole being assembled by tightening bolt 13 within the concavity of the cup.

A blade 50 comprising a second embodiment of our invention is shown in FIGS. 4 and 5 to have a bore 51 in a central portion 52, central flanges 53 and 54, and tips 55, one of which is shown, each having a cutting edge 56, a body 57 and a sail 60. Cutting edge 56 is not swept back in this embodiment of the invention, and sail 60 presents a somewhat swept forward configuration. Blade 50 is provided with ribs 61, also only one being shown, which are formed upwardly like ribs 30 in the first embodiment. The central portion of blade 50 is essentially flat to the angular discontinuity 62 by which it joins the tips, and in this case the ribs are carried all the way across the discontinuities to terminate outwardly of the beginnings of the cutting edges. This blade is to be secured to the mower in the same fashion as blade 10, using retainer 11, cup 12, bolt 13, and washer 14.

From the foregoing it will be apparent that we have invented a new and improved mower blade having a desired rigidity in which the reinforcing ribs are formed upwardly to avoid interference with air flow within the mower housing.

Numerous objects and advantages of our invention have been set forth in the foregoing description, together with details of the structure and function of the invention, and the novel features thereof are pointed out in the appended claims. The disclosure, however, is illustrative only and changes may be made in detail especially in matters of shape, size, and arrangement of parts, within the principle of the invention, to the full extent indicated by the broad general meaning of the terms in which the appended claims are expressed.

We claim as our invention:

1. A mower blade for rotation about a central substantially vertical axis comprising a pair of tip portions unitary with a central portion:

each of said tip portions comprising a leading, longitudinal beveled cutting edge, a body, and a trailing sail extending upwardly from said body;

said central portion including upward flanges, extending for limited distances along the central edges thereof; and upward medial longitudinal ribs extending outwardly from locations nearer the center of the blade than the outward terminations of said flanges, said ribs being broader near the center of the blade and tapering uniformly to become narrower at their outward ends, symmetrical about the longitudinal axis of the blade and symmetrically positioned about the blade center.

2. Apparatus according to claim 1 in which said tips are angularly discontinuous from said central portion, said ribs extend across the discontinuities, and said ribs terminate, both outwardly and inwardly, in segments of conical surfaces.

* * * * *